United States Patent [19]

Kruegle et al.

[11] Patent Number: 4,963,962
[45] Date of Patent: Oct. 16, 1990

[54] OPTICAL SURVEILLANCE ASSEMBLY AND CAMERA

[75] Inventors: Herman A. Kruegle, River Vale; Walter T. Sandin, Old Tappan, both of N.J.

[73] Assignee: Visual Methods, Inc., Westwood, N.J.

[21] Appl. No.: 301,657

[22] Filed: Jan. 25, 1989

[51] Int. Cl.$^5$ .............................................. H04N 7/18
[52] U.S. Cl. ..................................... 358/108; 358/229; 358/225; 354/81
[58] Field of Search .................. 358/108, 87, 225, 229, 358/213.28, 100, 99, 98; 354/25, 81; 310/36

[56] References Cited

U.S. PATENT DOCUMENTS

| | | | |
|---|---|---|---|
| 3,672,269 | 6/1972 | Tabankin | 354/75 |
| 3,720,147 | 3/1973 | Bemis | 358/229 X |
| 4,024,573 | 5/1977 | Carnes . | |
| 4,051,523 | 9/1977 | Laikin et al. . | |
| 4,331,979 | 5/1982 | Bendell . | |
| 4,404,595 | 9/1983 | Ushiro et al. . | |
| 4,499,490 | 2/1985 | Morgan . | |
| 4,510,526 | 4/1985 | Coutta et al. | 358/229 X |
| 4,510,529 | 4/1985 | Gottschalk . | |
| 4,639,772 | 1/1987 | Slayter et al. | 358/98 |
| 4,639,787 | 1/1987 | Isogai et al. . | |
| 4,651,226 | 3/1987 | Motoori et al. . | |
| 4,661,855 | 4/1987 | Gülck . | |
| 4,707,743 | 11/1987 | Tokumitsu et al. . | |
| 4,740,839 | 4/1988 | Phillips | 358/180 X |
| 4,833,534 | 5/1989 | Paff et al. | 358/229 X |
| 4,855,823 | 8/1989 | Struhs et al. | 358/108 |

OTHER PUBLICATIONS

"Mannequins Designed to Keep an Eye Out for Crime" American Journal Kelleher; Jul. 15, 1989, The Washington Post.
2 sheets of photographic images of protoype and production models of sprinkler head (CT Series; dated 5/25/89); Visual Methods, Inc., sales order No. 4751, dated 12/3/87; Visual Methods sales order No. 5073 dated 1/11/88; Visual Methods sales order No. 5824 dated 1/18/88; Visual Methods sales order No. 5895 dated 1/27/88.

Primary Examiner—James J. Groody
Assistant Examiner—Victor R. Kostak
Attorney, Agent, or Firm—R. Neil Sudol; Henry D. Coleman

[57] ABSTRACT

A covert surveillance camera assembly comprises a dummy sprinkler head for camouflaging a camera. The sprinkler head has a pair of parallel arms and a mirror is mounted in a predetermined position relative to the camera and between the arms of the sprinkler head. An associated mechanism for scanning an object area may include a rotating component for turning the mirror at a predetermined angular speed in a first direction about an optical axis of the optical device. A dovetail prism is provided for stabilizing an image transmitted from an outlet end of the surveillance assembly, the prism being rotated at one half the angular speed of the rotating mirror in a second direction about the optical device's axis opposite to the first direction. The camera includes (a) a housing, (b) a transducer disposed in the housing for converting incoming electromagnetic radiation into electrical signals, the transducer including a solid state image sensor, (c) an element for movably mounting the image sensor to the housing, and (d) a shifting mechanism operatively connected to the image sensor for reciprocating the image sensor along a substantially linear path in a direction essentially transverse to the incoming electromagnetic radiation.

20 Claims, 5 Drawing Sheets

OPTICAL SURVEILLANCE ASSEMBLY AND CAMERA

BACKGROUND OF THE INVENTION

This invention relates generally to optical surveillance and more particularly to covert surveillance assemblies with means for optically scanning an object area and to covert surveillance assemblies wherein the detectability of surveillance is minimized or reduced.

In conventional scanning systems, the image sensor, for example, a charge-coupled device ("CCD"), is fixed to the camera casing. Scanning of an area is achieved by pivoting the entire camera about one or more separate rotational axes.

Prior camera systems having mechanisms for scanning a visual field or object area are disclosed in U.S. Pat. Nos. 4,024,573, 4,051,523, 4,499,490, 4,661,855 and 4,707,743.

U.S. Pat. No. 4,024,573 to Carnes discloses a TV camera provided with a double-dove prism rotatably mounted in front of the camera lens, whereby the camera is capable of scanning a field extending nearly 360° around the camera.

U.S. Pat. No. 4,051,523 to Laikin et al. describes and illustrates a submersible television camera capable of scanning an angle of 180° from one side to the other by virtue of a lens mounted for rotating through 90° on each side of the lens' normal axis.

U.S. Pat. No. 4,499,490 to Morgan is directed to a scanning video camera assembly which includes an apparatus for moving a mirror about a horizontal axis and a vertical axis to achieve a multidirectional scan.

U.S. Pat. No. 4,661,855 to Gülck shows and describes a television camera wherein a light sensing element particularly in the form of a recording or camera tube is mounted in an insert in turn swivelably mounted to a camera housing by means of a universal joint. At a light receiving end the recording or camera tube has a photocathode disposed behind a focusing lens attached to the camera housing. An electrically controllable positioning motor swivels the camera insert in each or two mutually perpendicular planes to vary the viewing direction of the camera. The television camera disclosed by Gülck is designed for use in viewing the insides of sewer pipes.

U.S. Pat. No. 4,707,743 to Tokumitsu et al. relates to a method and apparatus for converting a image into filtered electrical signals. In a specific form of the apparatus illustrated in FIG. 8, the image is transmitted to a planar CCD via a lens and two swivelable mirrors. The CCD is exposed more than once to the image. Charges induced in each exposure are added upon shifting the charge positions in the CCD and are subsequently extracted as electrical signals.

OBJECTS OF THE INVENTIONS

An object of the present invention is to provide a covert surveillance assembly wherein detectability of a surveillance camera is reduced or minimized.

Another object of the present invention is to provide a surveillance assembly with optical scanning, wherein the optical scanning is accomplished with a miminum of intrusion.

Yet another object of the present invention is to provide a surveillance assembly with optical scanning, wherein the optical scanning is accomplished with greater speed than in prior scanning systems.

Another, more particular, object of the present invention is to provide a surveillance assembly with a camera having an especially compact design.

A further particular object of the present invention is to provide a surveillance assembly wherein a continuous 360° panning scan is obtained with no concomitant image rotation on a monitor.

Yet another particular object of the present invention is to provide a surveillance assembly with an improved method and means for pivoting a light receiving mirror.

SUMMARY OF THE INVENTION

The instant invention is directed in part to an assembly usable with a covert surveillance camera for minimizing the detectability thereof. The assembly comprises a component for camouflaging the camera, the camouflage component taking the form of a facsimile of an object typically found suspended from ceilings. In particular, the camouflaging component may take the form of a dummy sprinkler head. The assembly further comprises one or more elements for mounting the camouflaging component in a predetermined position relative to the camera. The assembly may also include the camera itself and a bracket or other device for mounting the camera at a hidden location. Advantageously, the sprinkler head has a pair of parallel arms and a mirror is mounted in a predetermined position relative to the camera and between the arms of the sprinkler head.

In accordance with another feature of the present invention, the covert surveillance assembly further comprises a light transmitting optical device including a casing mounted to a ceiling, the component for mounting the camouflaging component or sprinkler head including an element for attaching the sprinkler head to the casing.

In accordance with another feature of the present invention, the camera assembly includes a mechanism for scanning an object area. Specifically, the scanning mechanism may include a rotating component for turning the mirror about an optical axis of the optical device. The rotating component advantageously rotates the mirror at a predetermined angular speed in a first direction about an optical axis of the optical device. An additional component of the scanning mechanism is provided for stabilizing an image transmitted from an outlet end of the surveillance assembly, particularly from an outlet end of the optical device. The stabilizing component includes an optical element disposed along the optical axis of the optical device and also includes a drive operatively connected to the optical element for rotating the optical element at one half the angular speed of the rotating mirror in a second direction about the optical device's axis opposite to the first direction. Preferably, the counterrotating optical element takes the form of a dovetail prism.

In accordance with yet another feature of the present invention, wherein the optical device includes an additional mirror, the scanning mechanism including means for pivoting the additional mirror.

Pursuant to a further feature of the present invention, the scanning mechanism includes a component for pivoting the mirror which is located between the arms of the sprinkler head about a transverse axis substantially perpendicular to an optical axis of the optical device. In accordance with one embodiment of this feature, the pivoting component includes an electrically conductive coil disposed in juxtaposition to the mirror and an electrical power source operatively connected to the coil for feeding thereto an alternating or direct current to periodically pivot the mirror about the transverse axis. In accordance with an alternative embodiment of this feature of the invention, the pivoting component includes a elongate substantially rigid member attached at on end to the mirror and extending substantially parallel to the optical axis, the pivoting component further including a drive for translating the rigid member parallel to the optical axis.

In a surveillance camera assembly installable inside a ceiling for receiving light through a hole in the ceiling, the camera comprises, in accordance with the instant invention, (a) a housing, (b) a transducer disposed in the housing for converting incoming electromagnetic radiation into electrical signals, the transducer including a solid state image sensor, (c) an element for movably mounting the image sensor to the housing, and (d) a shifting mechanism operatively connected to the image sensor for reciprocating the image sensor along a substantially linear path in a direction essentially transverse to the incoming electromagnetic radiation. The shifting mechanism and the associated mounting element may be viewed as portions of the scanning mechanism pursuant to the invention. In particular, the shifting mechanism may operate to reciprocate the image sensor along two substantially orthogonal directions each substantially transverse to the incoming electromagnetic radiation. More particularly, the shifting mechanism includes a motor and transmission means including a rack and pinion for transmitting rotary power from the motor to the image sensor to move the sensor along a substantially linear portion of a circular path.

In an especially compact version of a covert surveillance camera in accordance with the present invention, a lens is mounted to a camera housing and a circuit is operatively connected to the image sensor for driving the image sensor and for processing signals generated thereby in response to incoming electromagnetic radiation. A circuit board which supports the circuitry and mounts it to the camera housing is juxtaposed to the lens and extends substantially parallel to an optical axis of the lens.

Pursuant to specific features of the present invention, the dummy or facsimile sprinkler head may be mounted to facsimile plumbing fittings or at a ceiling location.

A covert surveillance assembly which includes a facsimile ceiling fixture or other object such as a dummy sprinkler head in accordance with the instant invention is effective in disguising the presence of a camera to any all but the most conscientious of professionals. A sprinkler head is a ubiquitous ceiling fixture and consequently the presence of a fixture appearing to be a sprinkler head does not give rise to suspicions that an area is being monitored by a covert surveillance camera. The use of a sprinkler head also serves to camouflage a rotating mirror which is disposed between the arms of the sprinkler.

Detectability of a scanning covert surveillance camera is also reduceable in accordance with the present invention by locating above the ceiling surface the scanning parts which move. For example, if the camera has a solid state image sensor, the sensor may be shifted relative to the camera housing to effectuate the scanning of an object area. Alternatively or additionally, a pivotable mirror may be installed in an optical assembly which transmits light to the camera. Optical scanning may also be accomplished covertly via the processing of the electronic signals at the output of the image sensor: to view one portion of a scanned space, the signals corresponding to that space are selected for display on a monitor.

BRIEF DESCRIPTION OF THE DRAWING

FIG. 7 is a schematic side elevational view of a particular surveillance system using the covert surveillance assembly of FIG. 5.

FIG. 8 is partially a block diagram and partially a schematic side elevational view of another particular surveillance system using the covert surveillance assembly of FIG. 5.

FIG. 9 is a schematic perspective view of another covert surveillance assembly in accordance with the present invention, showing a particularly compact camera design.

FIG. 10 is a top view of a covert surveillance assembly incorporating the design of FIG. 9.

FIG. 11 is partially a block diagram and partially a schematic perspective view of an electronic scanning system in a covert surveillance assembly in accordance with the present invention.

FIG. 12 is a schematic side elevational view of a covert surveillance assembly in accordance with the present invention, having a circuit for rotating a mirror about two axes to achieve a scanning function.

DETAILED DESCRIPTION

Figure 1:
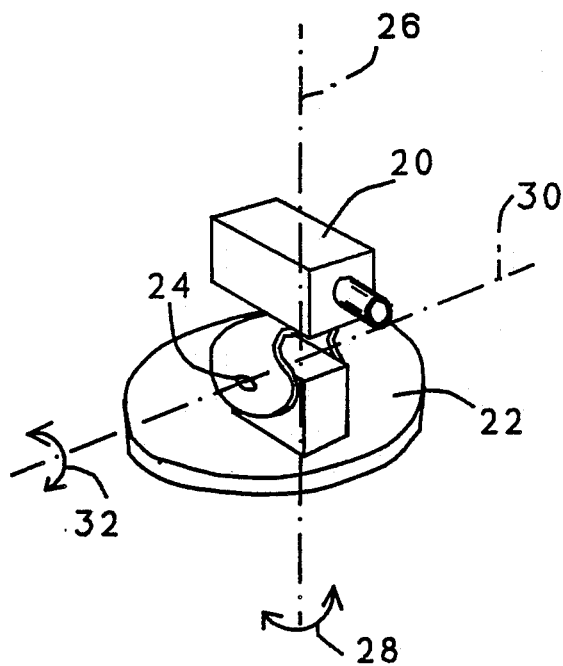
FIG. 1 is a schematic perspective view of a conventional covert surveillance camera with scanning capabilities.
Figure 2:
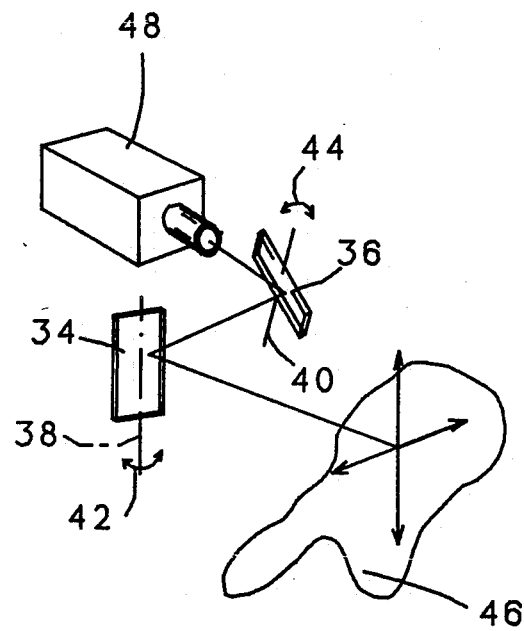
FIG. 2 is a schematic perspective view of another conventional covert surveillance camera with scanning capabilities.

The present invention is directed to covert surveillance assemblies wherein the detectability of the assembly and its scanning function is minimized or reduced. FIGS. 1 and 2 illustrate scanning assemblies in conventional covert surveillance systems. As shown in FIG. 1, a video camera 20 is mounted to a turntable 22 via a pivotable coupling 24, whereby the camera may be rotated about a vertical axis 26 (arrow 28) and a horizontal axis 30 (arrow 32) to enable a two-dimensional scanning of an object area. In another conventional scanning system, shown in FIG. 2, a pair of mirrors 34 and 36 pivot about respective, mutually orthogonal axes 38 and 40 (arrows 42 and 44) for transmitting light from an object area 46 to a camera 48.

Figure 3:
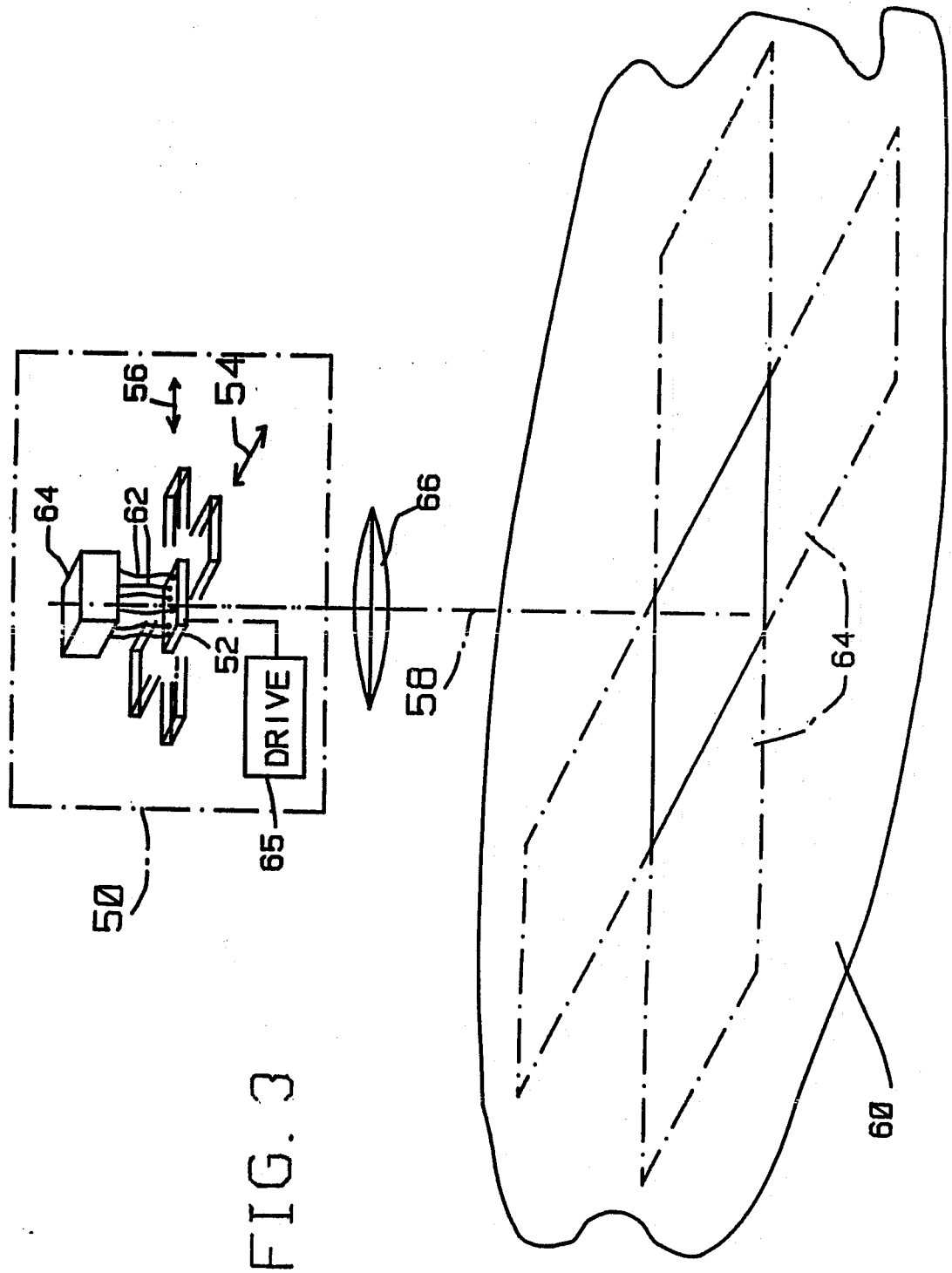
FIG. 3 is a diagram of a covert surveillance camera assembly in accordance with the present invention, showing a visually undetectable scanning mechanism.

In a primary embodiment of the present invention depicted schematically in FIG. 3, a camera 50 incorporates a solid state image sensor 52 in the form of a charge coupled device ("CCD") which is transversely shiftable, as indicated by arrows 54 and 56 and dot-dash outlines, in two mutually orthogonal directions substantially transverse to an optical axis 58 of the camera for scanning an object area 60. The CCD 52 is connected via electrical conductors 62 to an electronic unit 64 which includes circuitry for electrically driving the CCD and processing image-coding signals therefrom. A mechanical drive unit 65 is operatively connected to CCD 52 for reciprocating the image sensor along the two mutually orthogonal directions. As indicated by dot-dash lines in object area 60, small movements of CCD 52 result in large scanning ranges, depending on the focal length of camera optics 66.

An advantage of shifting CCD 52 to achieve scanning is that the small mass and low moment of inertia of the image sensor allows rapid movement and accordingly rapid scene scanning. Such rapidity is not obtainable when entire cameras, mounts and lenses have to be moved.

Figure 4:
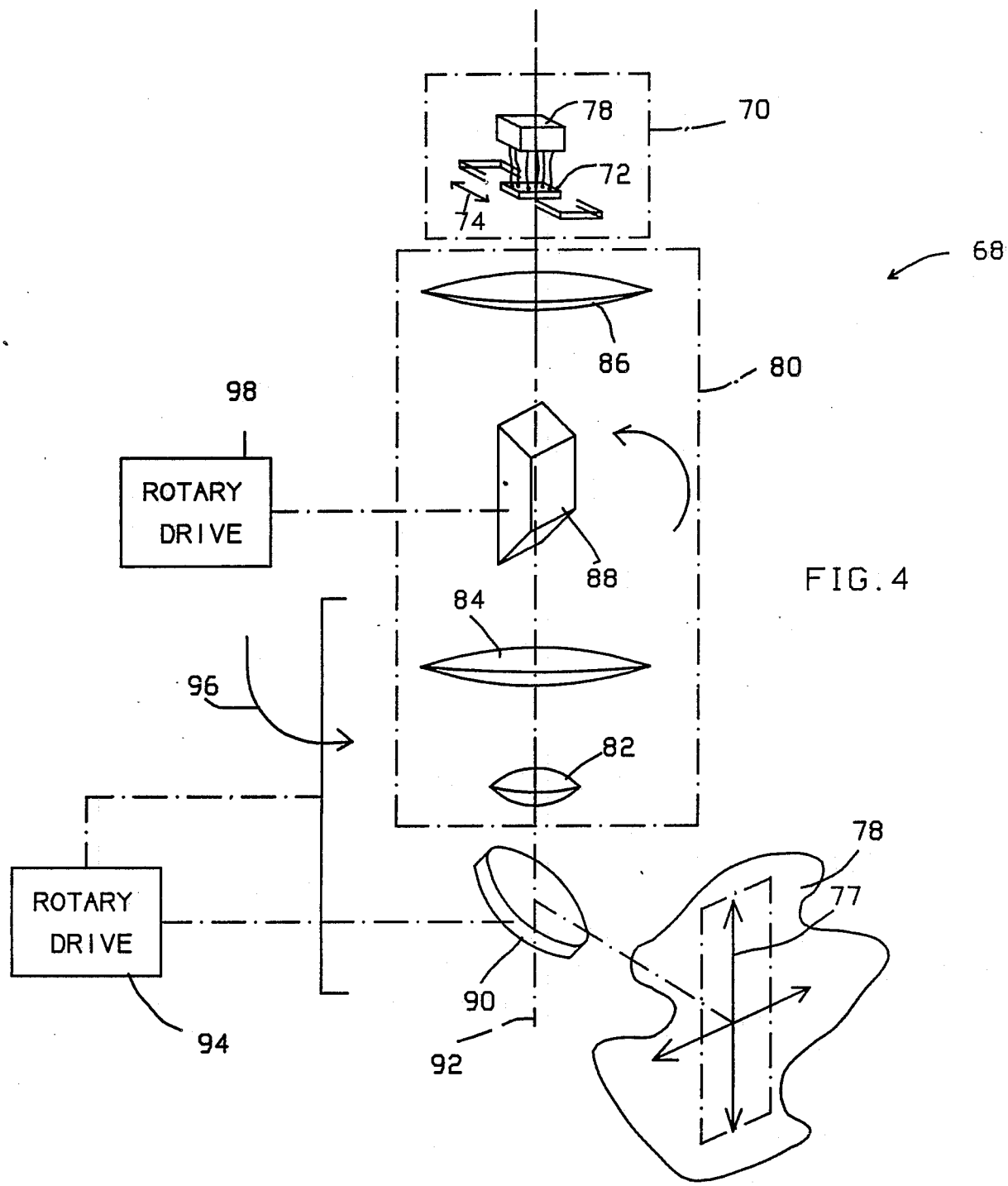
FIG. 4 is a diagram of a covert surveillance camera assembly in accordance with the present invention, showing a rotary panning mechanism with components for eliminating image rotation on a monitor screen.

As depicted in FIG. 4, a covert surveillance assembly 68 may include a camera 70 having a solid state image sensor 72, particularly a CCD, which is reciprocatingly shiftable along a single substantially linear path, as indicated by an arrow 74, to scan a visual field 76 along one direction 77. The camera housing (indicated in outline) contains an electronic unit 78 which includes circuitry for electrically driving the CCD and processing image-coding signals therefrom. Camera 70 receives light energy from visual field or object area 76 via an optical device or lens assembly 80 which includes a focusing lens 82 at an input end of the optical device, the input end being opposite camera 70. Optical device 80 further includes a pair of collimating lenses 84 and 86 and a dovetail prism 88 disposed between the collimating lenses. A mirror 90 is disposed the input end of optical device 80 for transmitting or reflecting towards camera 70 through optical device 80 electromagnetic waves arriving from visual field 76. Mirror 90 is advantageously mounted to optical device 80 for rotation about an optical axis 92 of the optical device. A rotary drive 94 is operatively connected to mirror 90 for rotating the mirror at a predetermined angular speed in a first direction about axis 92, as indicated by an arrow 96. Rotary drive 94 may also be operatively connected to pinhole focusing lens 82 for rotating that element at the predetermined angular velocity. Another rotary drive 98 is operatively linked to dovetail prism 88 for counterrotating the prism to stabilize an image transmitted from an outlet end of optical device 80. Stabilizing element or prism 88 is counterrotated at one half the angular speed at which mirror 90 is rotated by drive 94. The counterrotation of prism 88 eliminates image rotation on image sensor 72 and on a video monitor (not shown) which would otherwise arise due to the rotation of mirror 90.

The use of counterrotating prism 88 permits rapid scanning because the combined moment of inertia of mirror 90 and prism 88 (and possibly lens 82) is very small compared to the moment of inertia of a camera, mount, lens, etc. Most conventional scanning systems move at appoximately 6° per second. Maximum scanning speed is proportional to the square of the moment of inertia. Thus, a significant increase in the possible scanning rate is achieved if the moment of inertia is reduced.

A covert surveillance camera assembly having a shiftable solid state image sensor in accordance with the instant invention can scan a visual field or object area without being easily detectable by persons nearby. Scanning motion takes place within the camera housing or casing and the camera itself may be mounted on a hidden side of a ceiling or other barrier. Although rotating mirror 90 is disposed in a visible location, for example, below a ceiling surface, it can be rotated at a sufficiently low angular speed to significantly reduce detectability.

Figure 5:
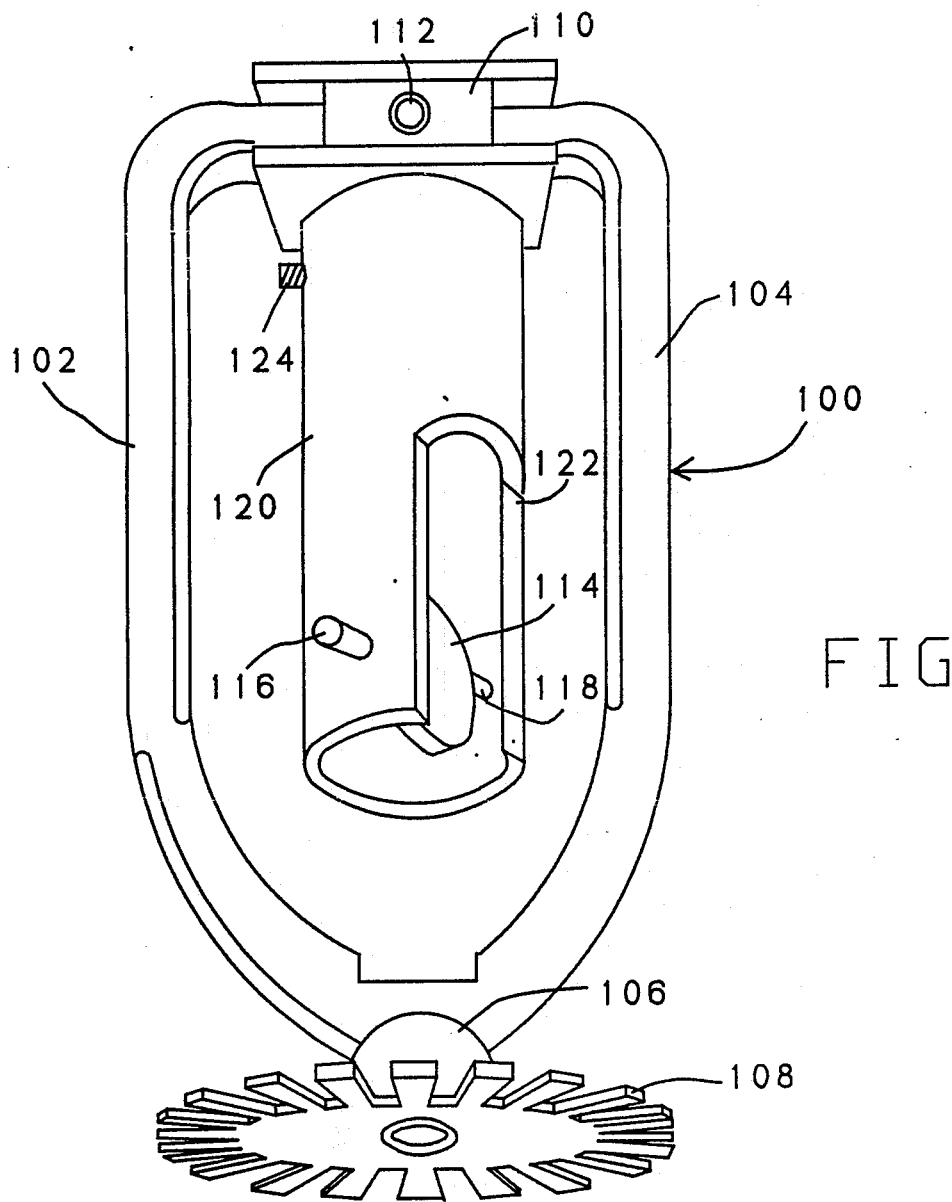
FIG. 5 is a perspective view of a covert surveillance assembly in accordance with the present invention, positionable on a ceiling to camouflage the presence of a surveillance camera.

The detectability of a covert surveillance assembly pursuant to the invention can be further reduced by the use of facsimile fixture. As illustrated in FIG. 5, the facsimile fixture may take the form of a dummy water sprinkler head 100 having a pair of parallel arms 102 and 104 converging to a lowermost end 106 which carries a water deflector 108 in the form of a daisy wheel. At an upper end sprinkler head 100 is provided with a mounting bracket 110 in which a set screw 112 is rotatably seated. Set screw 112 may be manipulated to attach sprinkler head 100 to, for example, a camera mounting bracket (not illustrated) or to a casing of optical device 80 (FIG. 4). A mirror 114 is mounted via one or two pivot pins 116 and 118 to a cylindrical housing 120 provided at one end with a substantially rectangular cutout 122 for admitting light from a scanned visual field. At an opposite end, mirror housing 120 is provided with a set screw 124 for enabling the disposition of housing 120 in a predetermined location at the input end of a camera, between arms 102 and 104 of sprinkler head 100.

Figure 6:
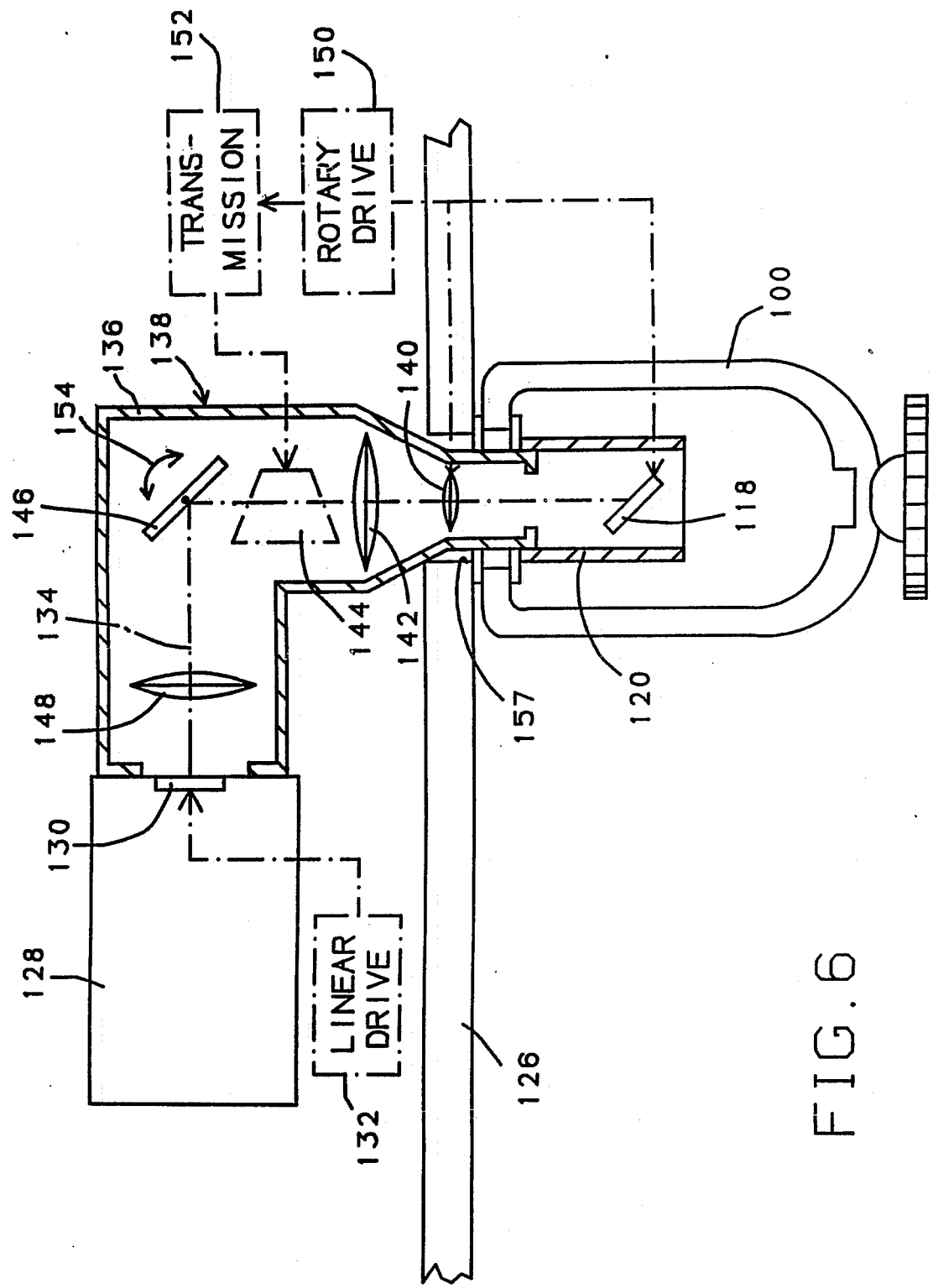
FIG. 6 is partially a block diagram and partially a schematic side elevational view, partly broken away, of the covert surveillance assemblies of FIGS. 3, 4 and 5, used in combination with one another.

FIG. 6 shows sprinkler head 100, mirror 118 and mirror housing 120 installed below a ceiling 126 above which is a covert surveillance camera 128 having a solid state image sensor or CCD 130 operatively connected to a drive 132 for shifting the CCD back and forth along a substantially linear path transverse to a path 134 of incoming electromagnetic radiation. Sprinkler head 100 and mirror housing 120 are connected by respective set screws 112 and 124 (see FIG. 5) to a lower or inlet end of a casing 136 of an optical device or lens assembly 138. The optical device includes a pinhole focusing lens 140, a first collimating lens 142, a dovetail prism 144, a mirror 146 and a second collimating lens 148. As described hereinabove with reference to FIG. 4, mirror 118 and prism 144 may be connected to a rotary drive 150 and a transmission 152, whereby mirror 118 may be rotated at a preselected speed in one direction and prism 144 counterrotated at half the preselected speed in the opposite direction to stabilize the detected image as viewed on a monitor. The rotation of mirror 118 and the shifting of CCD 130 together provide a two dimensional scan of an object area.

In the embodiment of FIG. 6, the scanning accomplished by the shifting of CCD 130 may be alternatively achieved, as indicated by an arrow 154, by pivoting mirror 146 about an axis 156 oriented transversely to optical path 134. In either case the scanning motion takes place on an upper side of ceiling 126 and, consequently, is hidden from view. Moreover, the panning rotation of mirror 118 about a vertical axis is camouflaged by housing 120 (only the motion of cutout 122 is likely to be detectable) and by dummy sprinkler head 100.

Pivoting mirror 146 is less desirable than shifting CCD 130 because rotating mirror 146 off axis causes less light to fall on CCD 130. More particularly, light from the edges of the object area does not pass through lens 148 onto CCD 130, thereby producing light loss at the edge of the object area or no visible image there at all.

Mirror 146 provides the additional benefits of reducing the physical height of the optics above the ceiling 126 and reverses the scene image which has already been reversed once by mirror 118, thereby resulting in a viewed image which has an orientation corresponding to the actual orientation of the scene being monitored.

Installing the covert surveillance assembly of FIG. 6 includes the following steps. Optical device 138 is inserted through a hole 157 in ceiling 126 and camera 128 is fixed with respect to the optical device. Sprinkler head 100 is placed on the input end of optical device 138 and set screw 112 tightened to fix the sprinkler head in position. Upon the securing of sprinkler head 100, mirror housing 120 is placed on the input end of optical device 138 and is rotated so that the image as viewed on a monitor is right side up. Set screw 124 (FIG. 5) is then tightened to secure mirror housing 120 to casing 136. It will be understood by one skilled in the art that the portion of casing to which mirror housing 120 is secured may be rotatable to allow for rotation of mirror 118, mirror housing 120 and pinhole focusing lens 140.

FIG. 7 shows sprinkler head 100 installed below a ceiling 158 above which is a covert surveillance optical assembly 160 including a casing 162 and a pinhole focusing lens 164 disposed at a narrowed end of the casing. Optical assembly 160 is inclined at an angle β with respect to a normal 166 to ceiling 158. Dot-dash lines 168 and 170 indicate the viewing field of the configuration of FIG. 7.

It is also within the purview of the present invention that optical assembly 160 (FIG. 7) be oriented vertically and that water deflector 108 (see FIG. 5) be provided with a central opening. Such an optical surveillance assembly would be useful in monitoring an area directly below the sprinkler head.

As depicted in FIG. 8, dummy sprinkler head 110, mirror 118 and mirror housing 120 may be used in combination with a miniature covert surveillance camera 172 disposed immediately above sprinkler head 110 at the level of a ceiling 174. The miniature camera has a solid state image sensor (not shown) which is positionable at the the focal point of a pinhole lens 176. No additional optics is needed for transmitting the incoming light energy from mirror 118 to the camera's image sensor. Drive and signal processing circuitry 178 for the image sensor may in part be located outside of the miniature camera, the circuitry having an input lead 180 extending from a power source 182 and an output lead 184 extending to a video monitor 186.

In the covert surveillance assembly of FIG. 8, scanning of an object area may be accomplished by pivoting mirror 118 about an axis 188 extending transversely to an optical axis 190. Mirror 118 is pivoted by a rigid wire or rod 192 connected at one end to an edge of mirror 118 and at an opposite end to a reciprocating drive 194.

In another specific embodiment of the invention, depicted schematically in FIG. 9, a shiftable solid state image sensor or CCD 200 is combined in a covert surveillance camera with a wide angle lens 202 and electronic signal processing circuitry 204 laterally disposed with respect to the lens and the sensor to produce a particularly compact camera capable of viewing large areas. The electronic drive and signal processing circuitry 204 is attached to printed circuit boards 206 and 208 disposed on opposite sides of lens 202 approximately parallel to an optical axis 210 of the lens. Sensor 200 is attached to a third printed circuit board 212 forming a bridge between boards 206 and 208.

As shown in FIG. 10, the assembly schematically depicted in FIG. 9 may be disposed on a turntable 214 which is rotatably attached to a base 216 in turn securable to an upper inside surface of a ceiling (not shown). A motor 218 fixed to base 216 has a rotor 220 connected to turntable 214 via a stepdown transmission in the form of an endless drive belt 222. Turntable 214 rotates about an axis perpendicular to the turntable.

Printed circuit boards 206, 208 and 212 form a unitary framework pivotably mounted to turntable 214 for limited rotation about an axis 223 parallel to the turntable. A second motor 224 fixed to turntable 214 has a rotor 226 proved at a free end with a pinion 228 meshing with a rack 230 on a rear surface of board 212. Motor 224 serves to pivot the circuit board framework and, concomitantly, sensor 200 about axis 223, thereby moving the sensor along a substantially linear portion of a circular path in a direction substantially transverse to the path of incoming electromagnetic radiation reflected towards image sensor 200 by a mirror 232.

The facsimile sprinkler head of FIG. 5 can be used in a covert surveillance assembly wherein scanning is accomplished by either an electronic scanning technique or an optical zooming system. As illustrated in FIG. 11, the scanning of an object area or visual field 234 may be accomplished electronically through proper programming of a processor 236. An objective lens AA and a 1:1 relay lens assembly 238 transmits light energy from visual field 234 onto a solid state image sensor 240. An operator can change the size and the location of the object area viewed on a monitor by inputting particular values of origin coordinates X and Y and particular values of image sensor pixel numbers X and Y. Zooming is accomplished electronically by electronic processing in a manner well known in the television industry. Different portions of visual field 234 exemplarily viewable on a monitor are shown schematically in the lower right hand corner of FIG. 11, the number of pixels of image sensor 240 in each case being indicated along the coordinates axes of the respective screen. The upper left hand screen is the only screen which shows the entire 400 by 500 pixel array of image sensor 240. The other three displays each show a lower number of pixels and hence a lower resolution.

Electronic scanning or zooming has the advantage that no movement of the image sensor or the optics is necessary to achieve the scanning function. A disadvantage of electronic zooming is that resolution is sacrificed inasmuch as under most conditions of use only a fraction of the total number of available pixels are utilized to produce an image on a monitor. Another disadvantage is that the scannable visual field is limited to that produced by the lens FOV.

In an optical zooming system, mirrors or lens are moved to focus a variable sized visual field or object area on the image sensor, as described hereinabove with reference to FIGS, 4, 6, 8, and 10. Of course, the mechanical movement of such optical elements may be disadvantageous. The advantage of optical zooming is the retention of the highest level of resolution possible with the system since all of the sensor pixels are used all of the time. This is the case, for example, if a zoom lens is used to focus differently sized visual fields on the image sensor.

As illustrated in FIG. 12, horizontal (pan) and vertical (tilt) scanning are achievable by rotating, about two essentially orthogonal axes, a mirror 242 disposed between the arms 102 and 104 of facsimile sprinkler head 100. Mirror 242 is made of metal. To tilt mirror 242, two electrically conductive coils 244 and 246 are provided. Coils 244 and 246 are spaced from one another and mirror 242 is disposed between the coils. A source 244 and 246 are provided. Coils 244 and 246 are spaced from one another and mirror 242 is disposed between the coils. A source of direct current 248 is connected to the coils for varying the polarity and magnitude of current flowing therethrough to thereby control the direction and rate of tilt of mirror 242 about a horizontal axis. Another pair of coils 250 (only one shown in the drawing for purposes of simplicity) are spaced from one another and disposed at right angles with respect to coils 244 and 246. Mirror 242 is also positioned between coils 250 and direct current source 248 is connected to the coils for varying the polarity and magnitude of current flowing therethrough to thereby control the direction and rate of planning of mirror 242 about a vertical axis. As described hereinabove with reference to FIG. 4, undesirable image rotation on a monitor can be eliminated through the use of a counterrotating prism.

Although the invention has been described in terms of particular embodiments and applications, one of ordinary skill in the art, in light of this teaching, can generate additional embodiments and modifications without departing from the spirit of or exceeding the scope of the claimed invention. For example, instead of a facsimile sprinkler head in accordance with the present invention may be mounted to a plumbing fixture instead of to a ceiling surface. Accordingly, it is to be understood that the drawings and descriptions herein are preferred by way of example to facilitate comprehension of the invention and should not be construed to limit the scope thereof.

What is claimed is:

1. A covert surveillance camera assembly comprising:
   a camera;
   means for mounting said camera at a hidden location;
   camouflage means for camouflaging said camera, said camouflage means including a facsimile of an object typically found adjoining said location;
   means for mounting said camouflage means in a predetermined position relative to said camera;
   a mirror rotatably mounted to said facsimile; and
   scanning means for scanning an object area, said scanning means including means for rotating said mirror about an optical axis of the camera assembly.

2. The camera assembly set forth in claim 1 wherein said means for rotating takes the form of first drive means operatively connected to said mirror for rotating said mirror at a predetermined angular speed in a first direction about an optical axis of the camera assembly, further comprising means for stabilizing an image transmitted from an outlet end of the camera assembly, said means for stabilizing including an optical element disposed along said optical axis, and also comprising second drive means operatively connected to said optical element for rotating said optical element at one half said angular speed in a second direction about said optical axis opposite to said first direction.

3. The camera assembly set forth in claim 1 wherein said camera includes transducer means for converting incoming electromagnetic radiation into electrical signals, said transducer means including a solid state image sensor, further comprising image scanning means for scanning an object area, said scanning means including means for movably mounting said image sensor in a camera housing and shifting means operatively connected to said image sensor for reciprocating said image sensor along a linear path in a direction substantially transverse to the incoming electromagnetic radiation.

4. The camera assembly set forth in claim 1 wherein said facsimile takes the form of a dummy sprinkler head.

5. An assembly usable in combination with a surveillance camera installable inside a ceiling for receiving light through a hole in said ceiling, said assembly comprising in combination:
   camouflage means including a dummy sprinkler head for camouflaging the camera;
   first mounting means for mounting said sprinkler head in a predetermined location relative to the camera, said sprinkler head having a pair of parallel arms;
   a mirror;
   second mounting means for mounting said mirror in a predetermined position relative to the camera, said predetermined position being between the arms of said sprinkler head; and
   means for pivoting said mirror about a horizontal axis.

6. The camera assembly set forth in claim 5 wherein said second mounting means includes a housing, said mirror being disposed in said housing, said housing being mounted in said predetermined position between the arms of said sprinkler head.

7. The camera assembly set forth in claim 6 wherein said housing is cylindrical and is provided with a cutout.

8. The camera assembly set forth in claim 5, said means for pivoting including an electrically conductive coil disposed in juxtaposition to said mirror and means operatively connected to said coil for feeding thereto an alternating current to periodically pivot said mirror about said transverse axis.

9. The camera assembly set forth in claim 5, said means for pivoting including an elongate substantially rigid member attached at one end to said mirror and extending substantially parallel to said optical axis, said means for pivoting further including means for translating said rigid member parallel to said optical axis.

10. A surveillance camera assembly installable inside a ceiling for receiving light through a hole in said ceiling, said camera comprising:
    a housing;
    transducer means disposed in said housing for converting incoming electromagnetic radiation into electrical signals, said transducer means including a solid state image sensor;
    mounting means for movably mounting said image sensor to said housing; and
    shifting means operatively connected to said image sensor for reciprocating said image sensor along a linear path in a direction substantially transverse to the incoming electromagnetic radiation.

11. The camera assembly set forth in claim 10, further comprising scanning means for scanning an object area, said scanning means including an optical subassembly with a mirror, said scanning means further including means for rotating said mirror about an optical axis of said optical subassembly.

12. The camera assembly set forth in claim 11 wherein said means for rotating takes the form of first drive means operatively connected to said mirror for rotating said mirror at a predetermined angular speed in a first direction about an optical axis of the optical assembly, further comprising means for stabilizing an image transmitted from an outlet end of the assembly, said means for stabilizing including an optical element disposed along said optical axis, and also comprising second drive means operatively connected to said optical element for rotating said optical element at one half said angular speed in a second direction about said optical axis opposite to said first direction.

13. The camera assembly set forth in claim 12 wherein said optical element takes the form of a dovetail prism.

14. An assembly usable in combination with a surveillance camera installable inside a ceiling for receiving light through a hole in said ceiling, said assembly comprising in combination:
   a casing;
   light transmission means mounted to said casing for receiving incoming electromagnetic radiation;
   first drive means operatively connected to said light transmission means for rotating said light transmission means at a predetermined angular speed in a first direction about an optical axis of the assembly;
   means for stabilizing an image transmitted from an outlet end of the assembly, said means for stabilizing including an optical element disposed along said optical path in said casing; and
   second drive means operatively connected to said optical element for rotating said optical element at one half said angular speed in a second direction about said optical axis opposite to said first direction.

15. The camera assembly set forth in claim 14, further comprising a pair of collimating lenses mounted in said casing, said optical element being disposed between said collimating lenses.

16. The camera assembly set forth in claim 14 wherein said optical element takes the form of a dovetail prism.

17. A surveillance camera assembly installable inside a ceiling for receiving light through a hole in said ceiling, said camera comprising:
   a housing;
   a lens mounted to said housing;
   transducer means disposed in said housing for converting incoming electromagnetic radiation into electrical signals, said transducer means including a solid state image sensor;
   circuit means operatively connected to said image sensor for driving said image sensor and for processing signals generated thereby in response to incoming electromagnetic radiation;
   mounting means for supporting said circuit means and mounting same to said housing, said mounting means including a circuit board juxtaposed to said lens and extending substantially parallel to an optical axis of said lens; and
   attachment means for securing said housing to an inner surface of an architectural member.

18. The camera assembly set forth in claim 17 wherein said mounting means includes a pair of circuit boards juxtaposed to said lens on opposed sides thereof, each of said boards extending substantially parallel to said optical axis.

19. The camera assembly set forth in claim 17 wherein said attachment means includes a turntable, said housing being fixed to said turntable and said turntable being secured to said architectural member.

20. An assembly usable in combination with a surveillance camera installable inside a ceiling for receiving light through a hole in said ceiling, said assembly comprising in combination:
   a mirror;
   first mounting means for mounting said mirror in a predetermined position relative to said camera;
   means for rotating said mirror, including an electrically conductive coil;
   second mounting means for mounting said coil in a position juxtaposed to said mirror; and
   means operatively connected to said coil for feeding thereto an alternating current to periodically pivot said mirror about an optical axis thereof.

* * * * *